United States Patent
Plancarte

(10) Patent No.: US 8,417,744 B2
(45) Date of Patent: Apr. 9, 2013

(54) TECHNIQUES TO MANAGE A COLLECTION OF OBJECTS IN HETEROGENEOUS ENVIRONMENTS

(75) Inventor: Gustavo Plancarte, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 47 days.

(21) Appl. No.: 13/069,539

(22) Filed: Mar. 23, 2011

(65) Prior Publication Data

US 2012/0246433 A1 Sep. 27, 2012

(51) Int. Cl.
*G06F 12/00* (2006.01)
*G06F 17/30* (2006.01)

(52) U.S. Cl.
USPC .......................... 707/813; 707/820; 719/316

(58) Field of Classification Search .................. 707/820
See application file for complete search history.

(56) References Cited

U.S. PATENT DOCUMENTS

| | | | |
|---|---|---|---|
| 6,047,295 A | 4/2000 | Endicott | |
| 6,065,020 A * | 5/2000 | Dussud | 707/999.206 |
| 6,253,215 B1 * | 6/2001 | Agesen et al. | 707/999.206 |
| 6,473,773 B1 | 10/2002 | Cheng | |
| 6,625,808 B1 | 9/2003 | Tarditiv | |
| 6,883,172 B1 * | 4/2005 | Angeline et al. | 719/315 |
| 7,519,640 B1 | 4/2009 | Garthwaite | |
| 2008/0270482 A1 * | 10/2008 | Hillberg et al. | 707/200 |
| 2009/0030959 A1 | 1/2009 | Beard | |
| 2009/0292749 A1 * | 11/2009 | Garst et al. | 707/206 |
| 2010/0114999 A1 | 5/2010 | Qi | |
| 2010/0153675 A1 * | 6/2010 | Kumar | 711/170 |

OTHER PUBLICATIONS

Garbage Collection and Ax Performance Whitepaper—Published Date: Oct. 28, 2006 http://axforum.info/forums/showthread.php?t=33106.
Richter, J. Garbage Collection Part 2: Automatic Memory Management in the Microsoft .NET Framework—Published Date: 2010, http://msdn.microsoft.com/en-us/magazine/bb985011.aspx.
What happens to a Weak Reference after GC of Weak Reference. Target—Published Date: Nov. 30, 2009 http://stackoverflow.com/questions/1813740/what-happens-to-a-weakreference-after-gc-of-weakreference-target.

* cited by examiner

*Primary Examiner* — Pierre Vital
*Assistant Examiner* — David T Brooks

(57) ABSTRACT

Techniques to perform garbage collection in an environment where more than one software programming language is in use are described. A technique may include creating a managed proxy object in one language that creates an unmanaged object in memory in a different language. A collection of nodes is generated and maintained, where a node comprises: a reference to the managed proxy object, and a reference to the unmanaged object. A count of the nodes in the collection is maintained. When the count exceeds a threshold, the collection is traversed, and garbage collection is performed on any unmanaged object in a node when the managed proxy object in the same node has been collected. Other embodiments are described and claimed.

17 Claims, 8 Drawing Sheets

TECHNIQUES TO MANAGE A COLLECTION OF OBJECTS IN HETEROGENEOUS ENVIRONMENTS

BACKGROUND

Many programming languages provide various memory management techniques for automatically clearing objects or other software components that are no longer being used from memory. This form of memory management is sometimes referred to as "garbage collection." Efficient garbage collection is important to preserving memory resources for the operation of the software while not adversely affecting performance of the software. Some garbage collection solutions may be inefficient. Other solutions may not preserve thread safety, while others may not be scalable. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to manage one or more collections of objects in heterogeneous environments. Some embodiments are particularly directed to techniques to perform a special form of resource management referred to as garbage collection for a set of objects in an efficient, scalable manner that preserves thread safety. In one embodiment, for example, a technique may include creating a managed proxy that creates a managed object and an unmanaged object in memory. A collection of nodes is generated and maintained, where a node comprises a weak reference comprising the managed object and the unmanaged object. A count of the nodes in the collection is maintained. When the count exceeds a threshold, the collection is traversed, and garbage collection operations are performed on any unmanaged object in a node when the managed object in the same node has been collected. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
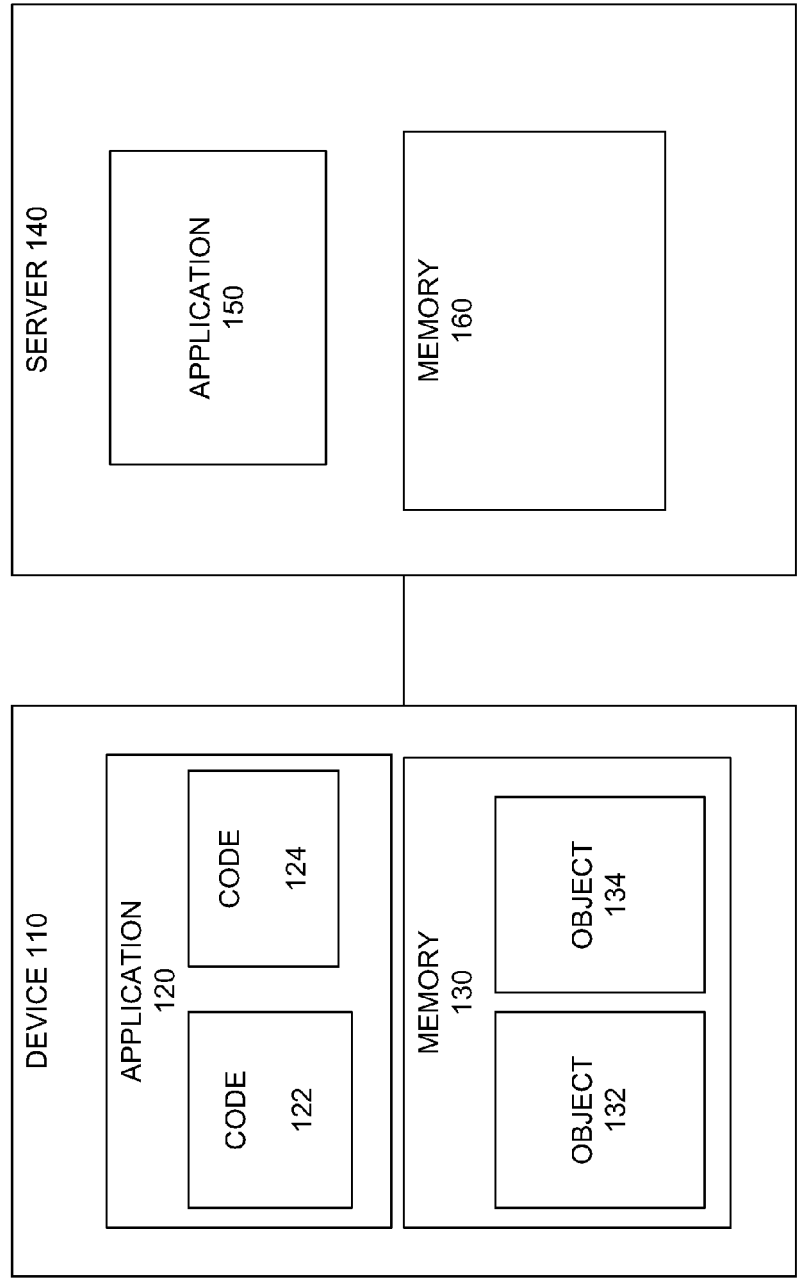
FIG. 1 illustrates an embodiment of a system for garbage collection in heterogeneous environments.

Various embodiments are directed to memory management techniques for performing automated memory management or garbage collection operations in heterogeneous environments, where a software application may be written in more than one programming language and/or more than one runtime environment. An application may be written in more than one language, for example, when the application makes use of code written by another entity, or older legacy code. Some programming languages are intrinsically better for some functionality or efficiencies than others, and applications may take advantage of the strengths of a programming language by using different languages for different functions within an application.

Different programming languages handle memory management, including garbage collection operations, differently. Garbage collection operations may generally refer to the practice of freeing, releasing or deallocating memory being used to hold application objects when an object is no longer in use by an application. Garbage collection operations can prevent errors such as memory leaks, where an increasing amount of memory becomes unavailable to the application because objects are not destroyed; and dangling pointers, where an object that is pointed to is destroyed but one or more pointers to the object are not, and are subsequently reused with unexpected results.

Some languages may have no automatic garbage collection capability, and therefore the programmer needs to properly deallocate memory for objects no longer in use. Some languages, such as C++, originated as manual garbage collected languages but now provide garbage collecting implementations. These languages provide a destructor operation that automatically frees the memory resources used by an object when the object is destroyed. Some languages with a garbage-collected environment, such as C# and Java, may use a finalizer. A finalizer operates similarly to a destructor, but is not called explicitly when an object is destroyed. Instead, a finalizer may be invoked when the internal garbage collection system frees the object. The programmer has no control over when a finalizer is invoked, or whether it is invoked at all. Finalizers also have the limitations of operating in only one thread, and of not working on objects that persist after garbage collection. In order to overcome some of the disadvantages of finalizers, some languages, such as C#, may use the dispose pattern, which provides a method that frees the resources used by an object. The dispose method typically must be manually invoked, in the code, by the client that uses the object once the client is finished with the object. Still other languages use reference counting, where a count is incremented each time an object is referenced by another object, and decreased when an object referencing it releases it. When the reference count reaches zero, the object may be destroyed.

When an application is written using two or more languages or runtimes, differences in garbage collection techniques may need to be resolved. An embodiment may generate a linked list of weak references to native objects for each application session operating in its own thread. A weak reference is a reference, such as a pointer, to an object, where the reference does not protect the object from being garbage collected. When a specified number of references has been added to the linked list, the linked list may be traversed to find any references to objects that are no longer in use. Those un-used objects may be destroyed, and the weak references may be removed from the list. References to objects that are still in use by the session may be kept. In an embodiment, the specified number of references at which the list is traversed may be adjusted up to accommodate situations where a large percentage of the objects are still in use after a traversal, or down where most objects are short-lived. As a result, the embodiments can improve performance, scalability, and thread safety in a software operating environment.

FIG. 1 illustrates a block diagram for a system 100 arranged to perform garbage collection operations for objects in heterogeneous environments. In one embodiment, for example, the system 100 may comprise a computer-implemented system having multiple components, such as a device 110, and a server 140. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, device 110 and server 140 may be implemented as electronic devices. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a smart phone, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

In various embodiments, device 110 may comprise application 120. Application 120 may include instructions that when compiled and executed, or interpreted, cause a logic device (not shown), such as a processor, on device 110 to perform various functions. Application 120 may be comprised of at least two portions of code: code 122 and code 124. Code 122 may be written in one programming language, sometimes referred to herein as "A", and code 124 may be written in a different programming language, sometimes referred to herein as "B." In an embodiment, code 122 may be considered the primary code, while code 124 may be considered the secondary code. For example, code 124 may include sub-routines, library files, kernel classes, or smaller components of functionality that code 122 calls or invokes, but that may not provide independent operability absent code 122. Code 122 may provide the general functionality of application 120. In an embodiment, for example, code 122 may be written in X++ and code 124 may be written in C++.

Application 120 may be any of a number of types of application. In an embodiment, for example, application 120 may be an enterprise resource planning (ERP) application. In another embodiment, application 120 may be an inventory management application. Application 120 may be an application having functionality that may be customized for a customer, licensee, owner, or user of the application. The functionality may be customized by altering code 122, for example, by directly rewriting some of the code, e.g. code 122, or by selecting settings that change the functionality of code 122. The embodiments are not limited to these examples.

Code 122 may include code that comprises a garbage collector. The garbage collector may be a function provided by the programming language, in particular when the programming language is a managed language. The garbage collector may be included in code 122, for example, when code 122 is compiled. The garbage collector may perform garbage collection on resources, such as objects, created by code 122. The garbage collector may not, however, be able to perform garbage collection directly on resources created by code 124.

Device 110 may include a computer-readable memory 130. Memory 130 may be used while application 120 is in operation. Memory 130 may be, generally, a fast-access type of memory, such as random access memory. During execution, application 120 may create one or more objects, such as object 132 and object 134. An object may refer to an instance of a class, for example in an object-oriented programming language. Objects 132, 134 may be other types of application resources placed in memory during the operation of application 120.

In an embodiment, device 110 may execute multiple instances, or "sessions," of application 120 at the same time. Each session may operate in a separate processor thread. The objects generated in each session may all be stored in memory 130. However, each session may perform garbage collection only on the objects in its thread.

In various embodiments, system 100 may comprise a server 140. Server 140 may be one or more electronic devices in communication with device 110, for example, over a network. Server 140 may comprise an application 150. In an embodiment, application 150 may be another instance of application 120 operating on server 140. Application 150 may execute its own versions of code 122 and code 124 (not shown). During execution, application 150 may instantiate objects and store them in memory 160 while the objects are in use. Application 150 may perform garbage collection analogously to application 120.

In an embodiment, server 140 may provide support services for application 120. Application 150 may, for example, provide data continuity services among multiple client devices including device 110.

In an embodiment, device 110 may operate as a client device. In an embodiment, application 150 may offer some or all of the functionality of application 120, while application 120 operates as a "dumb" terminal type of interface to application 150. Server 140 may host a number of sessions of application 150. Each session may operate in its own processor thread. The objects generated in different sessions may be stored in memory 160, while being logically isolated from the objects of other sessions. The garbage collection of the embodiments may be performed in each session, independently of the garbage collection that occurs in other sessions.

Figure 2:
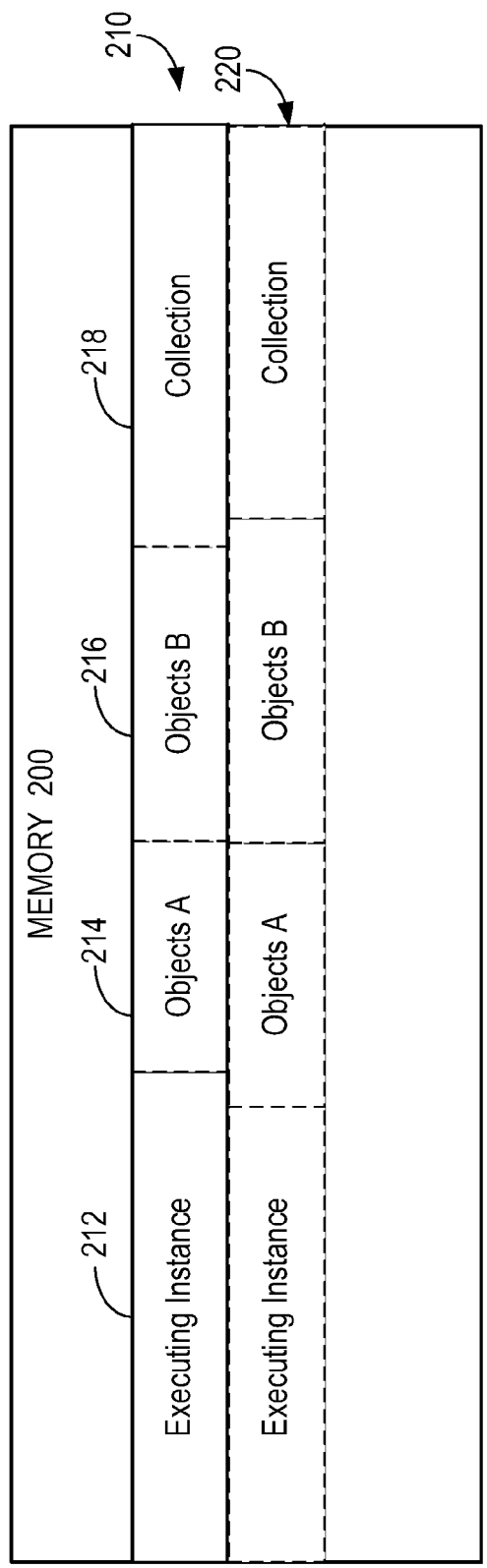
FIG. 2 illustrates an embodiment of a memory in use.

FIG. 2 illustrates an example of a memory 200 in use by an embodiment. Memory 200 may be a representative embodiment of memory 130 and/or memory 160. FIG. 2 may illustrate a moment in time of the operation of application 120 and/or application 150, and its use of memory 200. Memory 200 may include a block 210 of storage reserved for a processing thread and a block 220 of storage reserved for a separate processing thread.

Block 210 may include a session 212 of application 120 or application 150 in execution. Session 212 may include, for example, compiled instructions, variable values, counters, pointers and other application-related resources needed to provide the functions of application 120. Session 212 may comprise objects A 214, for example, from code 122 (in language A). Session 212 may also comprise objects B 216, for example, from code 124 (in language B).

In an embodiment, objects B 216 may include a native, managed object, such as a C++ object. Application 120 may, for example, make use of kernel classes written in code 124. When an object from code 124 is needed, a call from code 122 may instantiate a new object A that is a managed proxy object. The managed proxy object may, in turn, call code 124 to instantiate the needed object from code B. The managed proxy object may be a weak reference to the corresponding object B.

In an embodiment, a collection 218 may be maintained in block 210 for session 212. Collection 218 may include nodes that each comprise a managed proxy object A and the unmanaged code B object to which the managed proxy object A refers. In an embodiment, collection 218 may be a linked list, which is a series of nodes where each node points to the next node in the list. Collection 218 may also be implemented with other data structures where a node may be removed from any location in the collection, for example, as a set. The embodiments are not limited to these examples.

In an embodiment, during the operation of application 120 in session 212, a managed object in objects A may be garbage collected. When a managed object is collected, in its node in collection 218, the managed object is changed to a NULL reference. The unmanaged object created by the managed object, however, remains in memory. When collection 218 is later traversed, and a NULL reference is found in a managed object, the corresponding unmanaged object for that node may be "freed" from memory, and the node may be removed from the collection.

Block 220 in memory 200 may include a different session of application 120 or application 150. Block 220 may, for example, be a block of memory reserved for a different processing thread. The different session may include its own operating instance, objects A, objects B, and collection. Each session may perform garbage collection on only its objects, and may be protected from garbage collection occurring in other sessions.

Figure 3A:
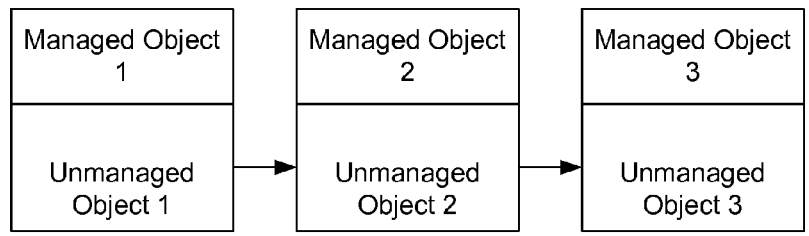
FIG. 3 illustrates an embodiment of a sequence of garbage collection.
Figure 3B:
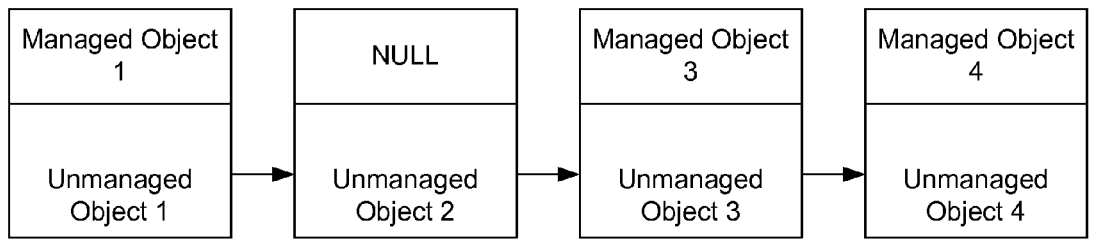
Figure 3C:
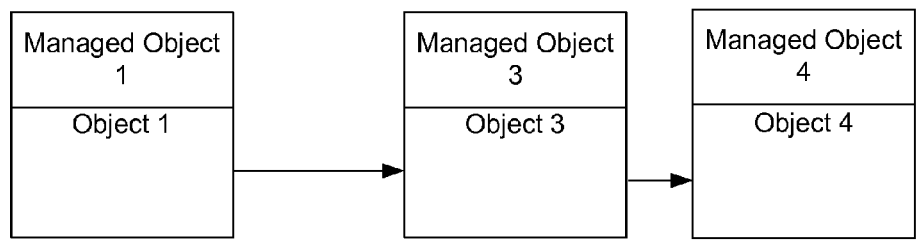

FIGS. 3A, 3B, and 3C illustrate a collection 300 at three different time periods. Collection 300 may be a representative embodiment of collection 218.

FIG. 3A illustrates collection 300 after application 120 has begun executing. In FIG. 3A, three nodes have been added to collection 300. Each node includes a weak reference managed object, e.g. an object from code A, and an object that is unmanaged, e.g. an object from code B. At the time of FIG. 3A, all three objects: object 1, object 2, and object 3, are in use by application 120. In the embodiment shown in FIG. 3, collection 300 is implemented as a linked list. However, the embodiments are not limited to this example.

FIG. 3B illustrates collection 300 at a later time than FIG. 3A. In FIG. 3B, managed object 2 has gone out of scope, e.g. because it is no longer in use, and has been garbage collected, causing it to point to NULL. Managed object 2's corresponding unmanaged object, object 2, however, is still in memory, even though it is not being used by application 120 at this time. Additionally, in FIG. 3B, a fourth node is added, for managed object 4 and object 4. For the purposes of this example, the fourth node is added after managed object 2 is garbage collected.

FIG. 3C illustrates collection 300 after a garbage collection event has taken place according to embodiments of the invention. In the illustrated embodiment, the addition of a fourth node to collection 300 in FIG. 3B triggers a garbage collection event. In general, garbage collection for the unmanaged objects may occur when a threshold number of nodes has been added to collection 300. In a garbage collection event, collection 300 is traversed. When a node is encountered that has a NULL pointer in a managed object portion, the corresponding unmanaged object is freed from memory and the node is removed from the collection. In FIG. 3C, therefore, when the NULL pointer in the node for object 2 is encountered during the traverse, object 2 is freed from memory and the node for object 2 is removed from collection 300. In an embodiment, freeing an object from memory may include making the bits in memory used by the object available to be written to. In an embodiment where the unmanaged object is a C++ object, the unmanaged object may be reference counted. A separate counter may keep track of the number of times a reference to the unmanaged object is created, and when the references are destroyed. When the reference counter reaches zero, this may indicate that the unmanaged object is no longer needed, and the FreeRef( ) method may be called on the object.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 4:
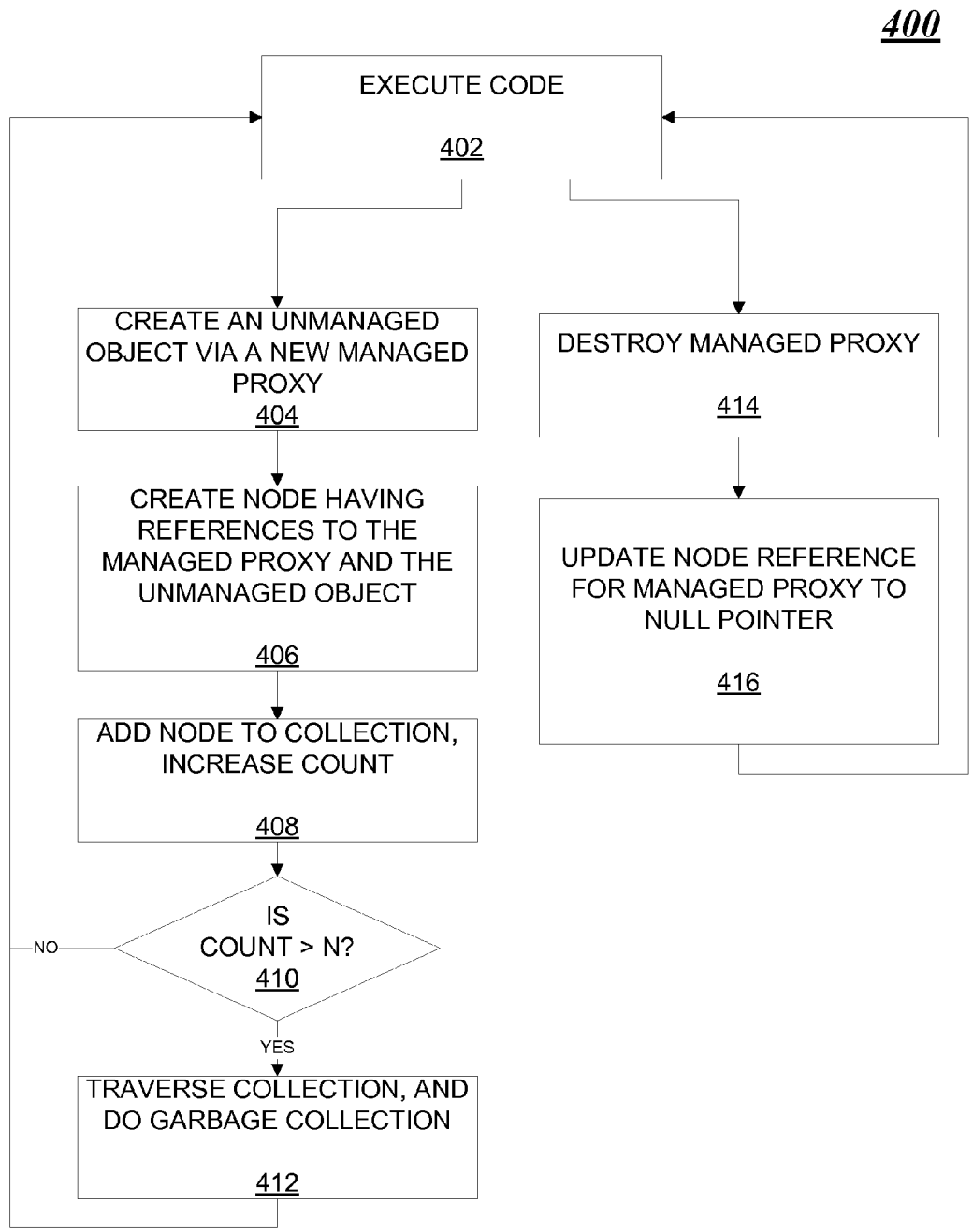
FIG. 4 illustrates an embodiment of a first logic flow for garbage collection.

FIG. 4 illustrates one embodiment of a logic flow 400. The logic flow 400 may be representative of some or all of the operations executed by one or more embodiments described herein.

In the illustrated embodiment shown in FIG. 4, the logic flow 400 may execute the code for application 120 at block 402. For example, application 120 or application 150 may be executed from compiled instructions, or may be interpreted. In an embodiment, application 120 or application 150 may execute in one of a plurality of sessions in a processing thread. During execution in block 402, application 120 or application 150 may execute an instruction in language A to instantiate an object A.

Logic flow 400 may instantiate an object from language B via a new managed proxy object from language A in block 404. For example, this may occur when the call to instantiate an object in language A is a call to a managed proxy class in language A. The call to the managed proxy class in language A may instantiate an object in language B. The managed proxy class may be a class from language A, that when called, instantiates a managed object in language A. Instantiating the managed proxy object in language A may include a call to instantiate an unmanaged object in language B.

Logic flow 400 may create a node having references to the managed object and to its corresponding unmanaged object in block 406. The node may be, for example, a data structure having at least two components: a reference, such as a pointer, to a managed proxy object, and a second reference to the unmanaged object instantiated by the managed proxy object. The node may additionally include other components, such as references to other nodes in the collection.

Logic flow 400 may add the node to a collection in block 408. For example, application 120 or application 150 may add the node to collection 218. If collection 218 is a linked list, then adding the node to the collection may include adding the node to the end of the list, and linking the previous last node to the newly added node. When the node is added to the collection, a count of the number of nodes in the collection may be increased by one.

Logic flow 400 may check whether the count is greater than a threshold N in block 410. When the count is not greater than N, logic flow 400 returns to block 402. Delaying garbage collection until a specified number of nodes has been added to the collection may prevent processing resources from being unnecessarily diverted for too-frequent garbage collection. In an embodiment, N may be adjustable to accommodate instances where objects are only needed for a short time, or where objects are needed for longer times. Adjusting N may effectively change the amount of time between garbage collections, and may reduce the impact on performance that garbage collection may have on the execution of application 120 or application 150.

When the count is greater than N, logic flow 400 may traverse the collection and perform garbage collection in block 412. Garbage collection may refer to detecting that an unmanaged object is no longer in use via its managed proxy object, and removing the unneeded unmanaged object from memory. Block 412 is described in further detail with respect to FIG. 5. If any unmanaged objects are removed during garbage collection, the corresponding nodes in the collection may be removed, and the count may be reduced according to the nodes removed.

While the code is executing in block 402, a previously created unmanaged object may no longer be needed, for example, when it was created during the execution of a subroutine that then ends. When the unmanaged object is no longer needed, logic flow 400 may destroy its corresponding managed proxy object in block 414. Destroying the managed proxy object may remove the managed proxy object from memory. The corresponding unmanaged object, however, remains in memory because it is not subject to automatic garbage collection.

In an embodiment, the unmanaged object may be reference counted. A separate counter may keep track of the number of times a reference to the unmanaged object is created, and when the references are destroyed. When the reference counter reaches zero, this may indicate that the unmanaged object is no longer needed, and logic flow 400 may garbage collect the corresponding managed proxy object.

Logic flow 400 may then locate the node corresponding to the destroyed managed proxy object in the collection, and may set the reference to the destroyed managed proxy object to reference NULL in block 416. Logic flow 400 then may return to executing code in block 402. In an embodiment, block 402 may represent the continued execution of application 120 or application 150, which may operate in parallel with blocks 414-416, and/or with blocks 404-412. In an embodiment, blocks 414-416 and block 404-412 may be included in the execution of a session of application 120 or application 150.

Figure 5:
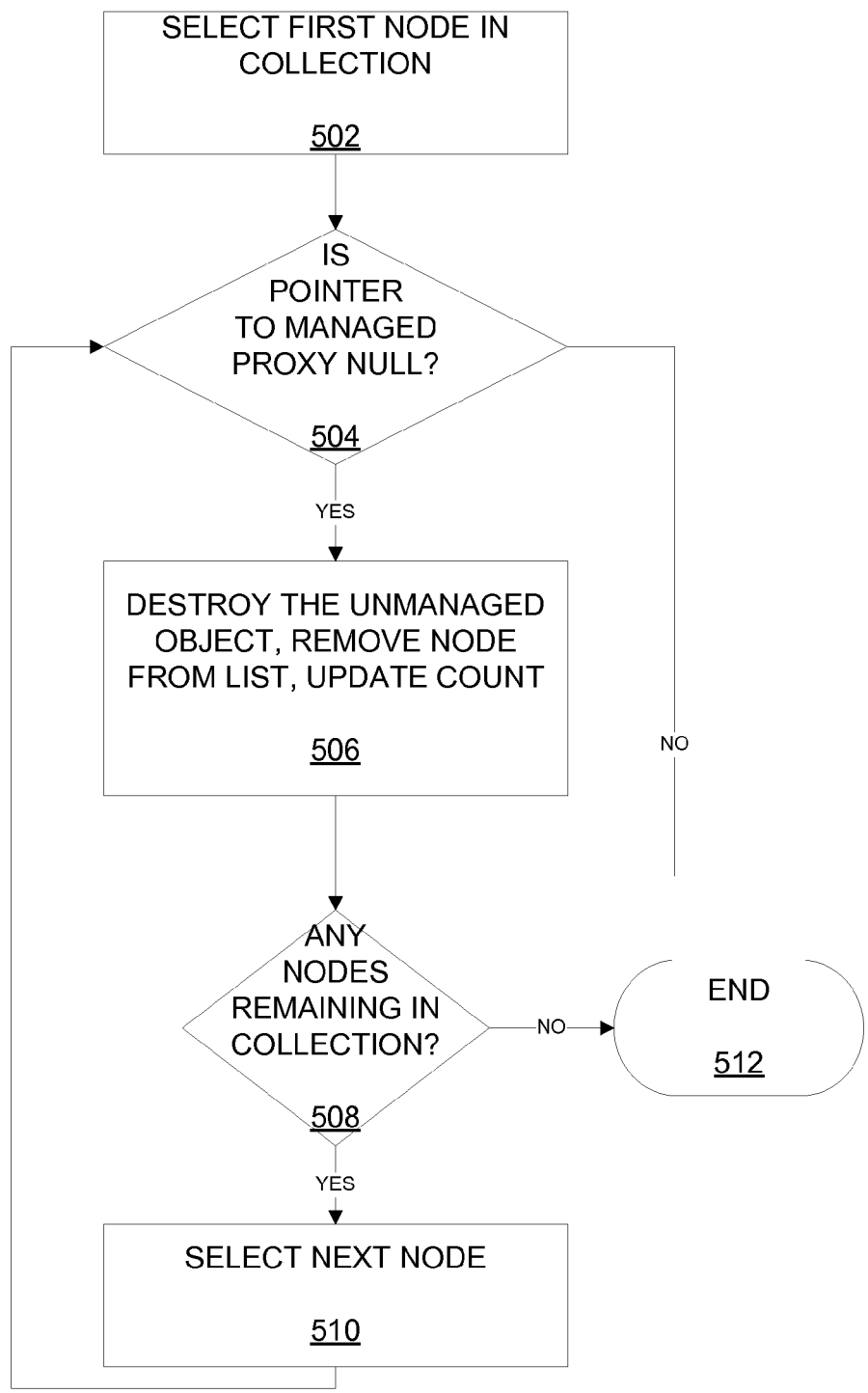
FIG. 5 illustrates an embodiment of a second logic flow.

FIG. 5 illustrates an embodiment of a logic flow 500. Logic flow 500 may be a representative embodiment of traversing a collection and performing garbage collection on unmanaged objects from block 412 from FIG. 4.

Logic flow 500 may select a first node in the collection in block 502. For example, if the collection, e.g. collection 218, is a linked list or other ordered collection, the first node in the linked list may be selected. In an un-ordered collection, a node may be selected randomly, or by age, and so forth.

Logic flow 500 may inspect the selected node to determine whether the managed proxy object reference is NULL in block 504. When the managed proxy object reference in the selected node is not NULL, the unmanaged object may still be in use, and logic flow 500 may proceed to the remaining nodes, if any, from block 508.

When the managed proxy object reference in the selected node is NULL at block 504, logic flow 500 may destroy, or free, the corresponding unmanaged object for that node, and may remove the node from the collection in block 506. When the node is removed from the collection, the count of nodes in the collection may be decremented by one to update the count.

If there are any unvisited nodes remaining in the collection in block 508, logic flow 500 may select a next node in block 510 and repeat the logic flow from block 504. When there are no more unvisited nodes, logic flow 500 may end in block 512.

Figure 6:
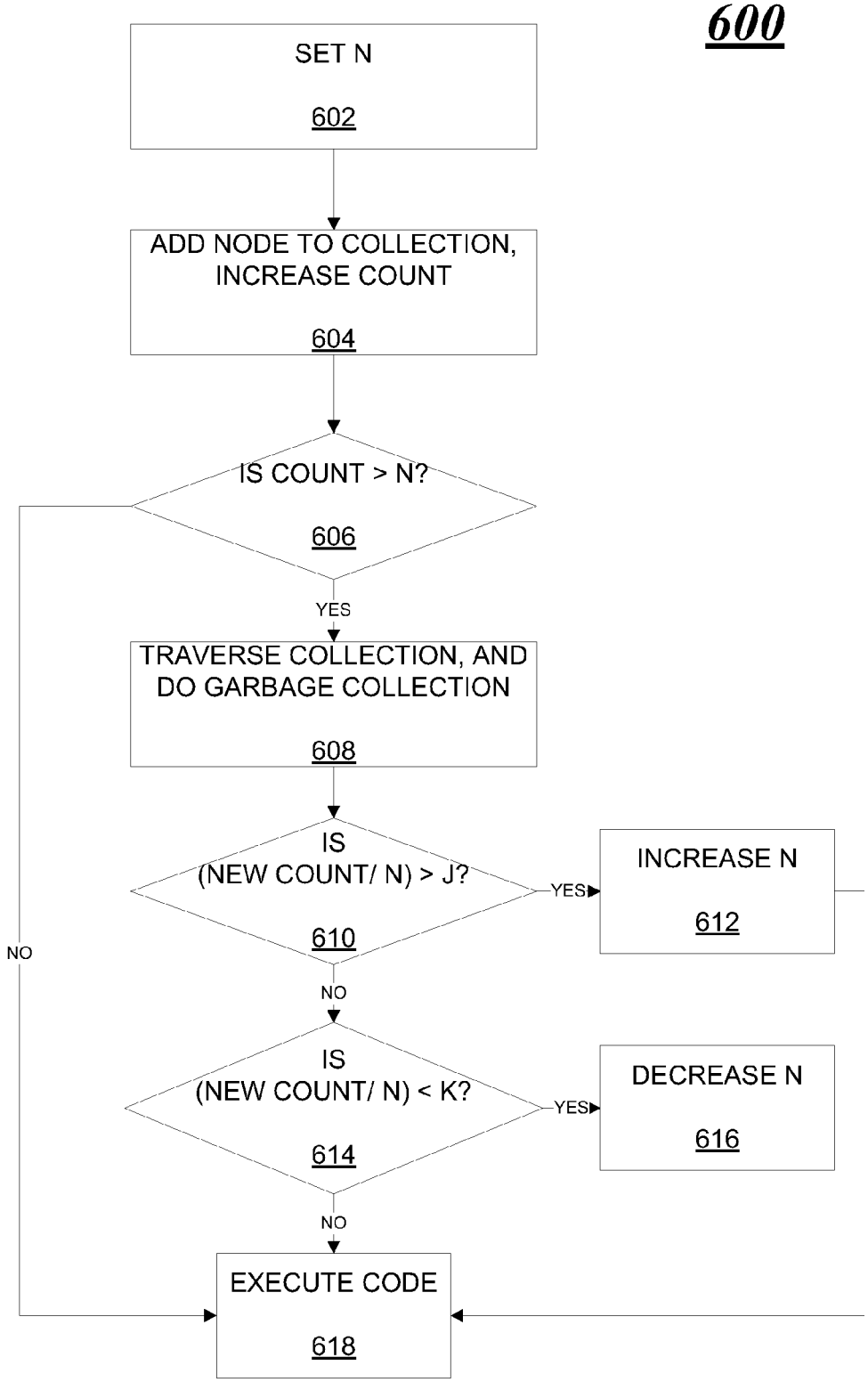
FIG. 6 illustrates an embodiment of a third logic flow.

FIG. 6 illustrates one embodiment of a logic flow 600. The logic flow 600 may be representative of some or all of the operations executed by one or more embodiments described herein. Logic flow 600 may be a representative modification to logic flow 400 from FIG. 4 that adjusts the time interval between garbage collection events according to the lifetimes of the created unmanaged objects.

In the illustrated embodiment shown in FIG. 6, logic flow 600 may set a value for N, the threshold number for nodes in the collection above which garbage collection is done, at block 602. For example, N, a positive integer, may be set initially to be some default value M, for example, 150. N may also be set as the maximum of some integer M and the current count divided by another integer L. Block 602 may occur when application 120 begins operating or at some later time, such as when the collection is first instantiated.

Logic flow 600 may add a node to the collection and increase the count of nodes in the collection at block 604. Block 604 may be analogous to the operation of block 408 from FIG. 4.

Logic flow 600 may compare the updated count to the value of N at block 606. When the count is not larger than N, logic flow 600 may continue executing code in block 618, analogously to block 402.

When the count is larger than N in block 606, logic flow 600 may traverse the collection and perform garbage collection in block 608, analogously to block 412. At the end of the garbage collection in block 608, the count of nodes in the collection may be updated, referred to herein as "new count," if any nodes were removed.

Logic flow 600 may compare the ratio of (new count):N to a value J, in block 610. J may be a floating point number between 0 and 1, for example, or a percentage. If only a small fraction or percentage of the collection was removed, that may indicate that most of the unmanaged objects are still in use, and that garbage collection can happen less frequently. When (new count)/N>J, then the value of N may be increased in block 612. For example, if J=0.9, then N may be increased when more than 90% of the collection remains after garbage collection. When (new count)/N is less than J, logic flow 600 may proceed to block 608.

N may be increased, in block 612, by a variety of methods. For example, N may be increased by adding a constant to N, e.g. 50. N may be increased by a percentage of its current value, e.g. N=N*1.1 to increase N by 10%. In an embodiment, N may be selected to be the maximum value of a constant and (new count)/H, where H is an integer. For example, N could be set to be the maximum of 150 and (new count)/10.

Logic flow 600 may compare the ratio of (new count:N) to a value K, at block 608, when (new count/N) is not greater than J. If a large fraction or percentage of the collection was removed during garbage collection, this may indicate that many of the objects are short lived and should be collected more frequently. When (new count)/N<K, then the value of N may be decreased in block 616.

N may be decreased, in block 616, by a variety of methods. For example, N may be decreased by subtracting a constant from N, e.g. N=N−50. N may be decreased by a percentage of its current value, e.g. N=N*0.8 to decrease N by 20%. In an embodiment, N may be selected to be the minimum value of a constant and (new count)/H, where H is an integer. For example, N could be set to be the minimum of 150 and (new count)/10.

Figure 7:
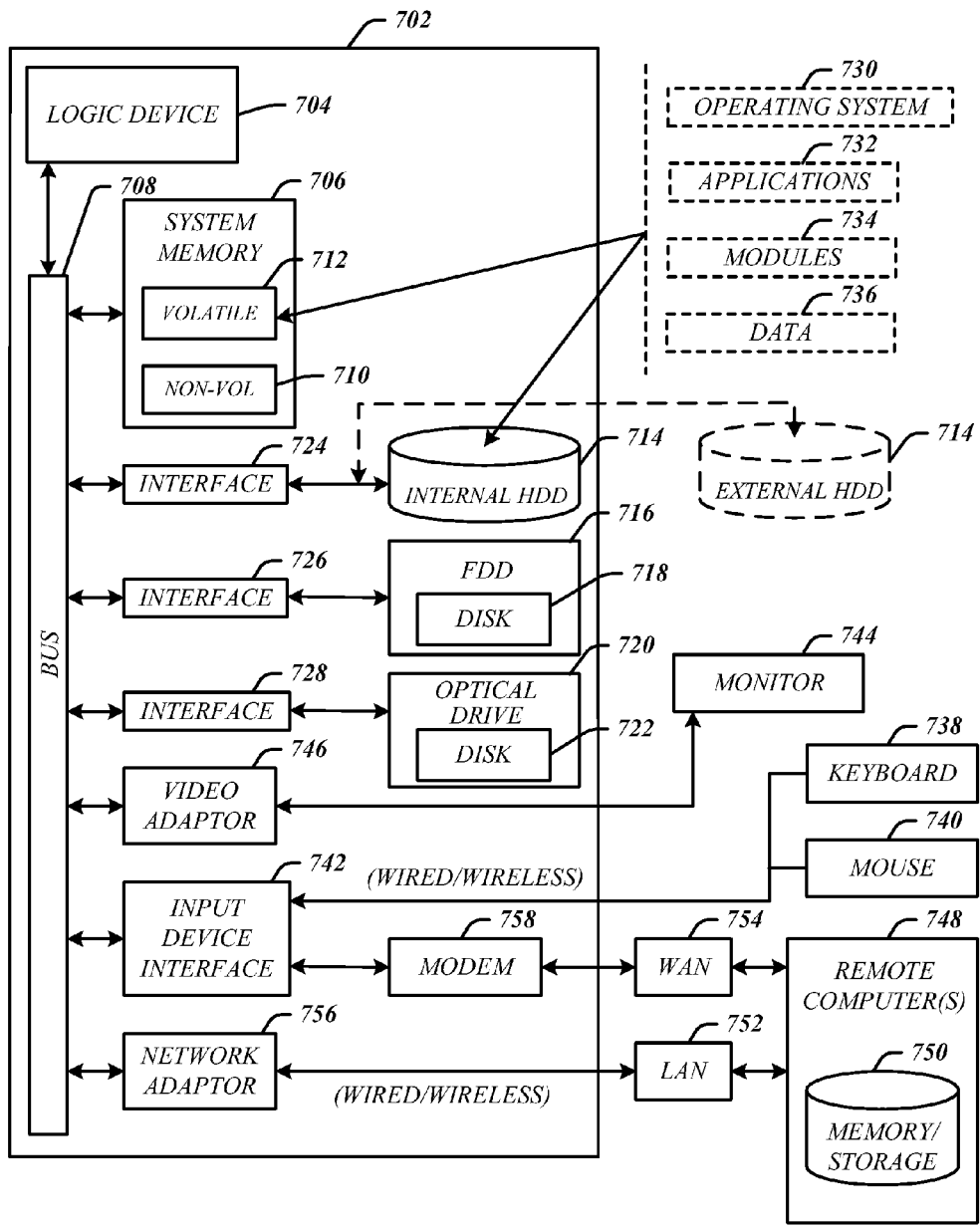
FIG. 7 illustrates an embodiment of a computing architecture.

FIG. 7 illustrates an embodiment of an exemplary computing architecture 700 suitable for implementing various embodiments as previously described. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a logic device 704, a system memory 706 and a system bus 708. The logic device 704 can be any of various commercially available processors. Dual microprocessors and other multi-processor architectures may also be employed as the logic device 704. The system bus 708 provides an interface for system components including, but not limited to, the system memory 706 to the logic device 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, application 120.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the logic device 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
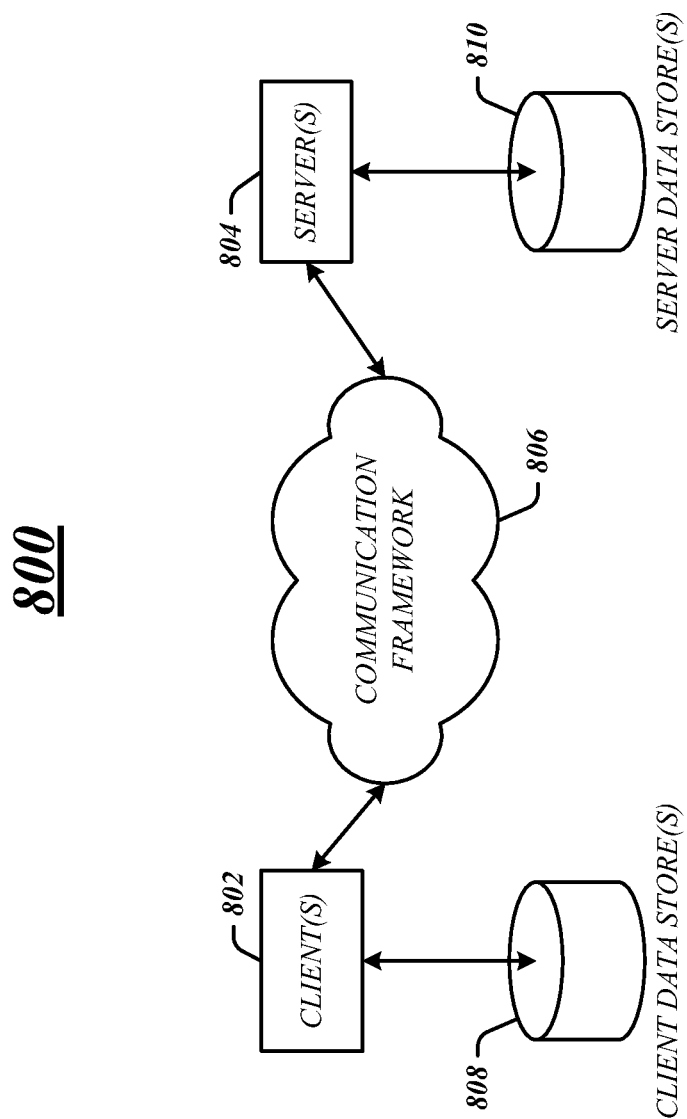
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the device 110. The servers 804 may implement the server 140. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method operating on a computing device, comprising:
   executing a session of an application in a single thread on a logic device, the application creating a managed proxy object that creates an unmanaged object in a memory;
   adding a node to a collection, where the node comprises a reference to the managed proxy object and a reference to the unmanaged object;
   maintaining a count of the number of nodes in the collection;
   reference counting the unmanaged object;
   collecting the managed proxy object by setting the managed proxy object in the node of the unmanaged object to point to null when the reference count of the unmanaged object becomes zero;
   traversing the collection when the count of the number of nodes exceeds a first specified number; and
   freeing an unmanaged object from the memory when the managed proxy object in the same node as the unmanaged object has been collected.

2. The method of claim 1, comprising:
   creating the managed proxy object using a first programming language; and
   creating the unmanaged object using a second programming language.

3. The method of claim 2, the first programming language comprising a managed language and the second programming language comprising an unmanaged language.

4. The method of claim 1, comprising:
   determining the percentage of nodes removed from the collection after traversing the collection;
   increasing the first specified number when the percentage is smaller than a first specified percentage; and
   decreasing the first specified number when the percentage is larger than a second specified percentage.

5. The method of claim 1, comprising adjusting the first specified number to be the maximum of a first integer, and the number of objects in the collection divided by a second integer.

6. The method of claim 1, comprising removing the node from the collection when an unmanaged object in the node is freed from the memory.

7. The method of claim 6, the collection comprising a linked list.

8. The method of claim 1, comprising executing a plurality of sessions of the application each in one of a plurality of threads on the logic device, each thread having its own collection of nodes and performing garbage collection on its own managed proxy objects.

9. An article comprising a storage medium device containing instructions that when executed cause a system to:
   execute an application in a single thread on a logic device, the application to create a managed proxy object that creates an unmanaged object in a memory;
   add a node to a collection, where the node comprises references to the managed proxy object and the unmanaged object;
   maintain a count of the number of nodes in the collection;
   reference count the unmanaged object;
   collect the managed proxy object by setting the managed proxy object in the node of the unmanaged object to point to null when the reference count of the unmanaged object becomes zero;
   traverse the collection when the count of the number of nodes exceeds a first specified number;
   release an unmanaged object from the memory when the managed proxy object in the same node as the unmanaged object has been collected; and
   remove the node from the collection.

10. The article of claim 9, further comprising instructions that when executed cause the system to:
    determine the percentage of nodes removed from the collection after traversing the collection;
    increase the first specified number when the percentage is smaller than a first specified percentage; and
    decrease the first specified number when the percentage is larger than a second specified percentage.

11. The article of claim 9, further comprising instructions that when executed cause the system to adjust the first specified number to be one of a first integer and the number of objects in the collection divided by a second integer.

12. The article of claim 9, wherein the managed proxy object is a weak reference to the unmanaged object, wherein the weak reference does not protect the unmanaged object from being garbage collected.

13. An apparatus, comprising:
    a logic device;
    a storage medium communicatively coupled to the logic device; and
    an application operating in a single thread on the logic device, the application operative to: create a managed proxy object that creates an unmanaged object in the storage medium, add a node comprising a weak reference to the managed proxy object and a reference to the unmanaged object to a collection of a specific number of nodes, reference count the unmanaged object, collect the managed object by setting the managed proxy object in the node of the unmanaged object to point to null when the reference count of the unmanaged object becomes zero, traverse the collection to identify the node where the managed proxy object has been collected, and free the storage medium occupied by the unmanaged object in the identified node.

14. The apparatus of claim 13, the application operative to determine the percentage of nodes removed from the collection after traversing the collection, increase a first specified number when the percentage is smaller than a first specified percentage, and decrease the first specified number when the percentage is larger than a second specified percentage, wherein the first specified percentage is larger than the second specified percentage.

15. The apparatus of claim 14, the application further operative to increase the first specified number by one of adding a constant to the first specified number, increasing the first specified number by a percentage of the current value of the first specified number, or setting the first specified number to be the maximum of a constant and a fraction of the number of nodes remaining in the collection.

16. The apparatus of claim 14, the application further operative to decrease the first specified number by one of subtracting a constant from the first specified number, decreasing the first specified number by a percentage of the current value of the first specified number, or setting the first specified number to be the minimum of a constant and a fraction of the number of nodes remaining in the collection.

17. The apparatus of claim 13, the logic device to operate a plurality of sessions of the application in separate threads, wherein each session has its own collection of nodes and performs garbage collection on its own managed proxy objects.

* * * * *